United States Patent
Wonderlich et al.

(10) Patent No.: US 11,219,154 B2
(45) Date of Patent: Jan. 11, 2022

(54) PLANTER ROW UNIT ADJUSTMENT CONTROL

(71) Applicant: Deere & Company, Moline, IL (US)

(72) Inventors: Grant J. Wonderlich, Milan, IL (US); James R. Peterson, Annawan, IA (US)

(73) Assignee: DEERE & COMPANY, Moline, IL (US)

(*) Notice: Subject to any disclaimer, the term of this patent is extended or adjusted under 35 U.S.C. 154(b) by 286 days.

(21) Appl. No.: 16/399,465

(22) Filed: Apr. 30, 2019

(65) Prior Publication Data

US 2020/0344944 A1 Nov. 5, 2020

(51) Int. Cl.
| | |
|---|---|
| A01C 7/20 | (2006.01) |
| A01B 79/00 | (2006.01) |
| A01C 5/06 | (2006.01) |
| A01C 7/10 | (2006.01) |

(52) U.S. Cl.
CPC ............ *A01C 7/203* (2013.01); *A01B 79/005* (2013.01); *A01C 5/068* (2013.01); *A01C 7/105* (2013.01)

(58) Field of Classification Search
CPC ......... A01C 7/203; A01C 5/068; A01C 7/105; A01C 7/201; A01C 7/20; A01C 7/00; A01C 5/066; A01C 5/06; A01C 5/00; A01C 7/102; A01C 7/10; A01C 7/08; A01B 79/005; A01B 79/00
See application file for complete search history.

(56) References Cited

U.S. PATENT DOCUMENTS

| | | | |
|---|---|---|---|
| 4,413,685 A | 11/1983 | Gremelspacher et al. | |
| 7,673,570 B1 | 3/2010 | Bassett | |
| 9,888,624 B2 | 2/2018 | Maniar et al. | |
| 10,091,926 B2 | 10/2018 | Maro | |
| 2012/0048160 A1 | 3/2012 | Adams et al. | |
| 2012/0060730 A1 | 3/2012 | Bassett | |
| 2014/0026748 A1 | 1/2014 | Stoller et al. | |
| 2016/0165789 A1 | 6/2016 | Gervais et al. | |
| 2018/0042171 A1 | 2/2018 | Maro | |

FOREIGN PATENT DOCUMENTS

| | | |
|---|---|---|
| EP | 3150046 A1 | 4/2017 |
| EP | 3300563 A1 | 4/2018 |

OTHER PUBLICATIONS

Extended European Search Report and Written Opinion issued in European Patent Application No. 20169081.5, dated Oct. 1, 2020, in 8 pages.

*Primary Examiner* — Christopher J. Novosad
(74) *Attorney, Agent, or Firm* — Michael Best & Friedrich LLP

(57) ABSTRACT

A row unit for a seeding machine operable to plant seeds into soil. A frame supports a furrow opener, a gauge wheel, a seed dispenser, and a furrow closer. A row unit downforce actuator is operable to push the row unit frame toward the soil to adjustably control soil engagement forces for the furrow opener, the gauge wheel, and the furrow closer. An acceleration sensor is configured to detect accelerations of the row unit. A controller is in communication with the acceleration sensor and the row unit downforce actuator, and the controller is programmed with an algorithm to maintain a target downforce value during operation of the row unit. The controller is further programmed to abandon the target downforce value and relieve the row unit downforce actuator in response to a signal from the acceleration sensor indicative of acceleration of the row unit in excess of a predetermined threshold.

20 Claims, 4 Drawing Sheets

PLANTER ROW UNIT ADJUSTMENT CONTROL

BACKGROUND

The present disclosure relates to mobile agricultural machines, in particular seeding machines having a plurality of row units for seeding.

Various factors affect seeding performance and thus crop yields. One such factor is the amount of downforce applied to the row unit for engaging the various ground-engaging implements of the row unit with the soil. Planters are known to have row units with downforce actuators that can provide fixed or adjustable downforce while planting.

SUMMARY

In one aspect, the disclosure provides a row unit for a seeding machine operable to plant seeds into soil. A frame supports a furrow opener for opening a furrow in the soil, a gauge wheel for rolling atop the soil, a seed dispenser for dispensing seeds into the furrow, and a furrow closer for closing the furrow. A row unit downforce actuator is operable to push the row unit frame toward the soil to adjustably control soil engagement forces for the furrow opener, the gauge wheel, and the furrow closer. An acceleration sensor is configured to detect accelerations of the row unit. A controller is in communication with the acceleration sensor and the row unit downforce actuator, and the controller is programmed with an algorithm to maintain a target downforce value during operation of the row unit. The controller is further programmed to abandon the target downforce value and relieve the row unit downforce actuator in response to a signal from the acceleration sensor indicative of acceleration of the row unit in excess of a predetermined threshold.

In another aspect, the disclosure provides a row unit for a seeding machine operable to plant seeds into soil. A frame supports a furrow opener for opening a furrow in the soil, a gauge wheel for rolling atop the soil, a seed dispenser for dispensing seeds into the furrow, and a furrow closer for closing the furrow. A furrow closer downforce actuator is operable between the row unit frame and the furrow closer to exert an adjustable force that pushes the furrow closer downward on the soil. A controller is programmed to increase downforce in response to a detected increase in travel speed of the row unit.

In yet another aspect, the disclosure provides a row unit for a seeding machine operable to plant seeds into soil. A frame supports a furrow opener for opening a furrow in the soil, a gauge wheel for rolling atop the soil, a seed dispenser for dispensing seeds into the furrow, and a furrow closer for closing the furrow. A row cleaner is positioned and operable to engage the soil and clear residue from the path forward of the furrow opener, the row cleaner supported by the frame to be adjustable through a range of soil engagement settings. A controller is programmed to adjust a row cleaner engagement setting in response to a detected travel speed of the row unit.

Other aspects of the disclosure will become apparent by consideration of the detailed description and accompanying drawings.

DETAILED DESCRIPTION

Before embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

Figure 1:
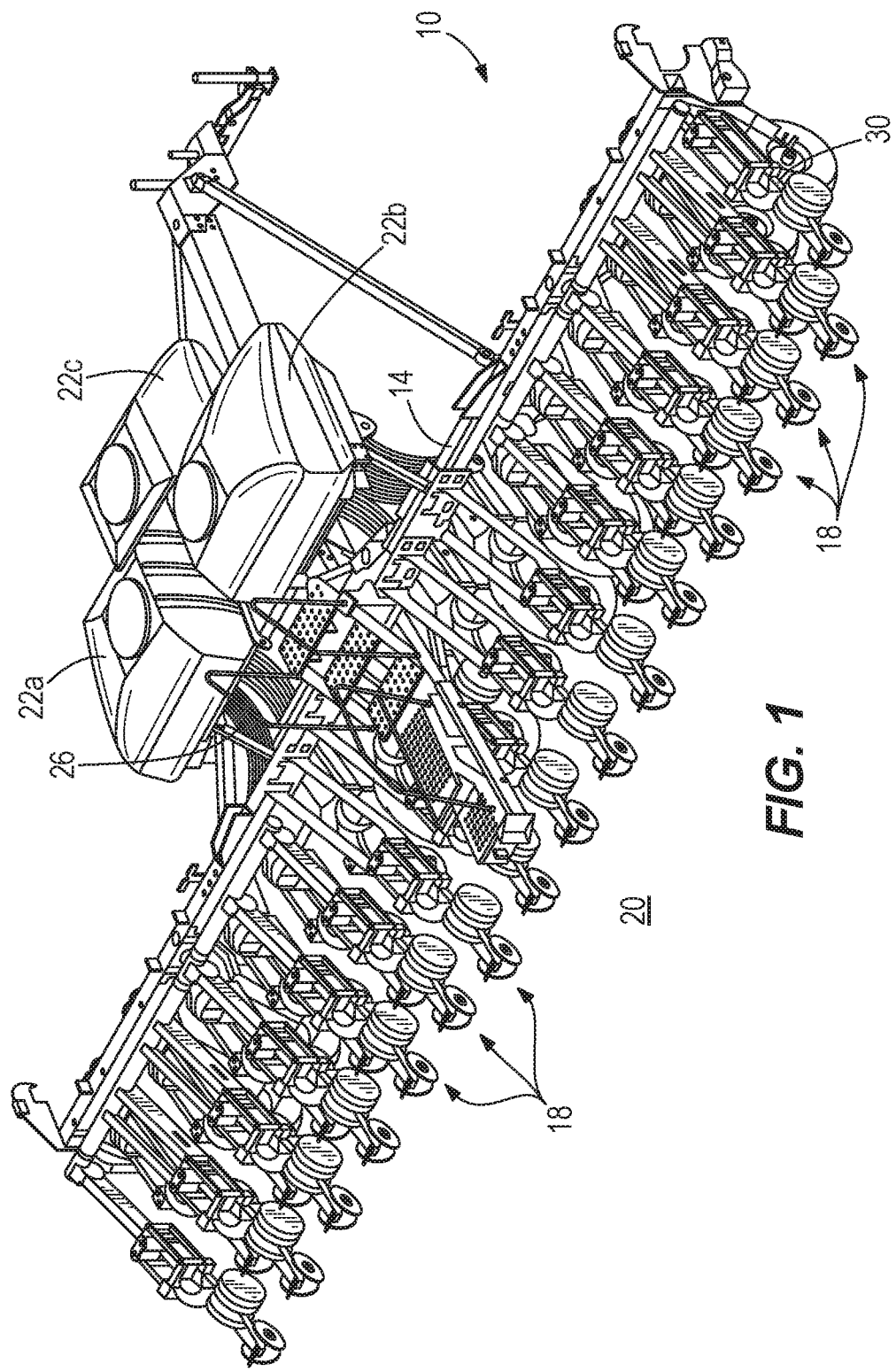
FIG. 1 is a perspective view of a seeding machine.

FIG. 1 illustrates a seeding machine 10 (e.g., a row crop planter). The seeding machine 10 includes a main frame 14. A plurality of individual row units 18 are coupled (e.g., mounted) on a rear portion of the main frame 14, such that the row units 18 are pulled over or across a layer of soil 20. Alternatively, the row units 18 may be positioned forward of the frame 14 and pushed over or across the soil layer 20, or the machine may have a combination of push and pull row units 18. Seed sources, such as storage tanks 22a-22c, are coupled to the main frame 14 and hold seed that is delivered, e.g., pneumatically or in any other suitable manner, to a mini-hopper (not shown) associated with each row unit 18. The storage tanks 22a-22c are coupled to the mini-hoppers by way of conduits 26, such as hoses, and a pressurized delivery apparatus (not shown). Each storage tank 22a-22c contains the same or different varieties of seed to be planted in the soil 20. Each row unit 18 is connected to a conduit 26 such that each row unit 18 is coupled to a storage tank 22a-22c to receive seed. As illustrated by way of example only in FIG. 1, each row unit 18 further includes its own sub-frame 30, to which various components (e.g., a furrow opener, a furrow closer, etc.) are mounted.

Figure 2:
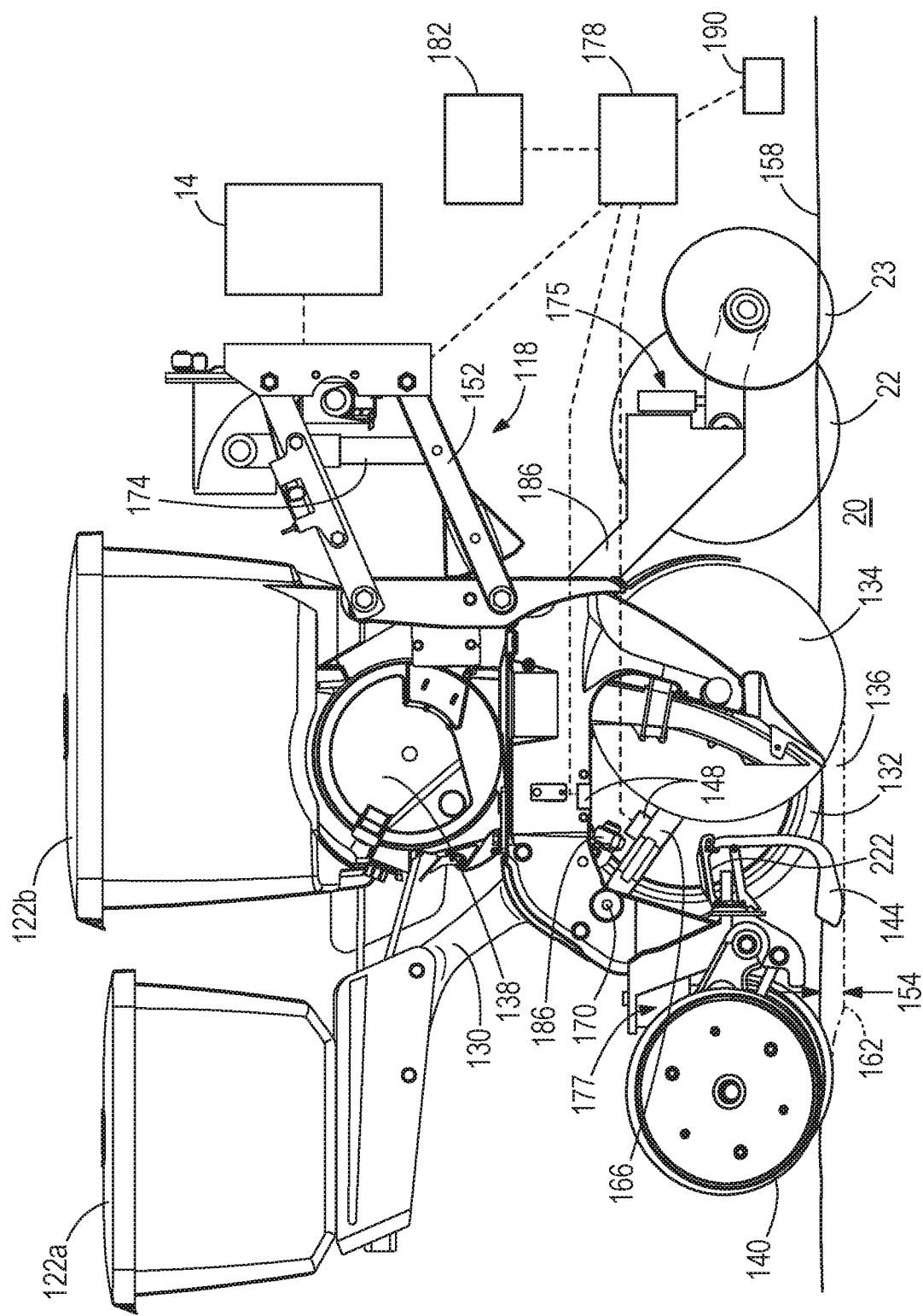
FIG. 2 is a partial schematic side view of a row unit of the seeding machine of FIG. 1, including gauge wheel arms and gauge wheels.

FIG. 2 illustrates an example of a row unit 118 that may be used in place of any one or more of the row units 18 in FIG. 1. Similar to the row unit 18, the row unit 118 is also coupled to the main frame 14. In some constructions, a plurality of row units 118 are coupled to the main frame 14, similar to the row units 18 in FIG. 1. As illustrated in FIG. 2, each row unit 118 includes hoppers 122a, 122b, which hold chemical and seed, respectively (as opposed to the row unit 18 receiving seed from bulk storage as in the construction illustrated in FIG. 1). The hoppers 122a, 122b are coupled to a row unit sub-frame 130. Each row unit 118 also includes a gauge wheel or wheels 132 coupled to the row unit sub-frame 130. The gauge wheel 132 contacts and rolls along the soil 20, and a furrow opener 134 (e.g., an opening wheel or blade or other structure having a stationary or rotating surface that contacts and moves soil away to form a furrow) is coupled to the row unit sub-frame 130 for forming a furrow 136 (illustrated schematically) in the soil 20. A seed metering device 138 coupled to the row unit sub-frame 130 receives seeds from the hopper 122b and meters and dispenses the seeds into the furrow 136. A furrow closer 140 (e.g., a closing and packing wheel or wheels or other structure having a stationary or rotating surface that contacts and presses soil 20) coupled to the row unit sub-frame 130 pushes soil around the seeds to close the furrow 136 (see FIG. 1). Each row unit 118 may also include a seed firmer 144 (e.g., an angled arm as illustrated in FIG. 2, a press wheel coupled to a press wheel arm, or other structure that firms a seed) coupled to the row unit sub-frame 130 that firms each seed and pushes it into the open furrow 136 to ensure good seed to soil contact before the furrow 136 is closed. The illustrated seed firmer 144 is supported on the sub-frame 130 by a linkage 222, in particular a parallelogram linkage. FIG. 2 also illustrates an optional coulter wheel 22 and row cleaner 23 forward of the furrow opener 134.

The row unit 118 also includes a downforce adjustment mechanism 174 coupled to the main frame 14 and to the row unit sub-frame 130. The downforce adjustment mechanism 174 includes springs, pneumatics, hydraulics, linkages, and/or other structures forming an actuator such that when the downforce adjustment mechanism is activated, the downforce adjustment mechanism 174 pushes the row unit sub-frame 130 of the row unit 118 and consequently the furrow opener 134 into the soil 20 to dig the furrow 136. The gauge wheels 132, however, continue to ride along the top surface 158 of the soil 20. A depth 154 of the furrow 136 is measured from a top surface 158 of the soil 20 to the bottom 162 of the furrow 136, along a direction that is perpendicular to the top surface 158 (assuming a flat, non-inclined top surface 158), and therefore depends on a position of the gauge wheels 132 relative to the furrow opener 134. In some constructions, the depth 154 is equivalent to a distance between a bottom of the gauge wheel or wheels 132 and a bottom of the furrow opener 134. The downforce adjustment mechanism 174 is mounted on a coupling assembly 150 that couples the row unit 118 to the main frame 14. In the example shown in FIG. 2, a rod of the actuator forming the downforce adjustment mechanism 174 is coupled to a link of a parallel linkage 152 and is used to exert downward force on the row unit 118 through the parallel linkage 152.

Figure 4:
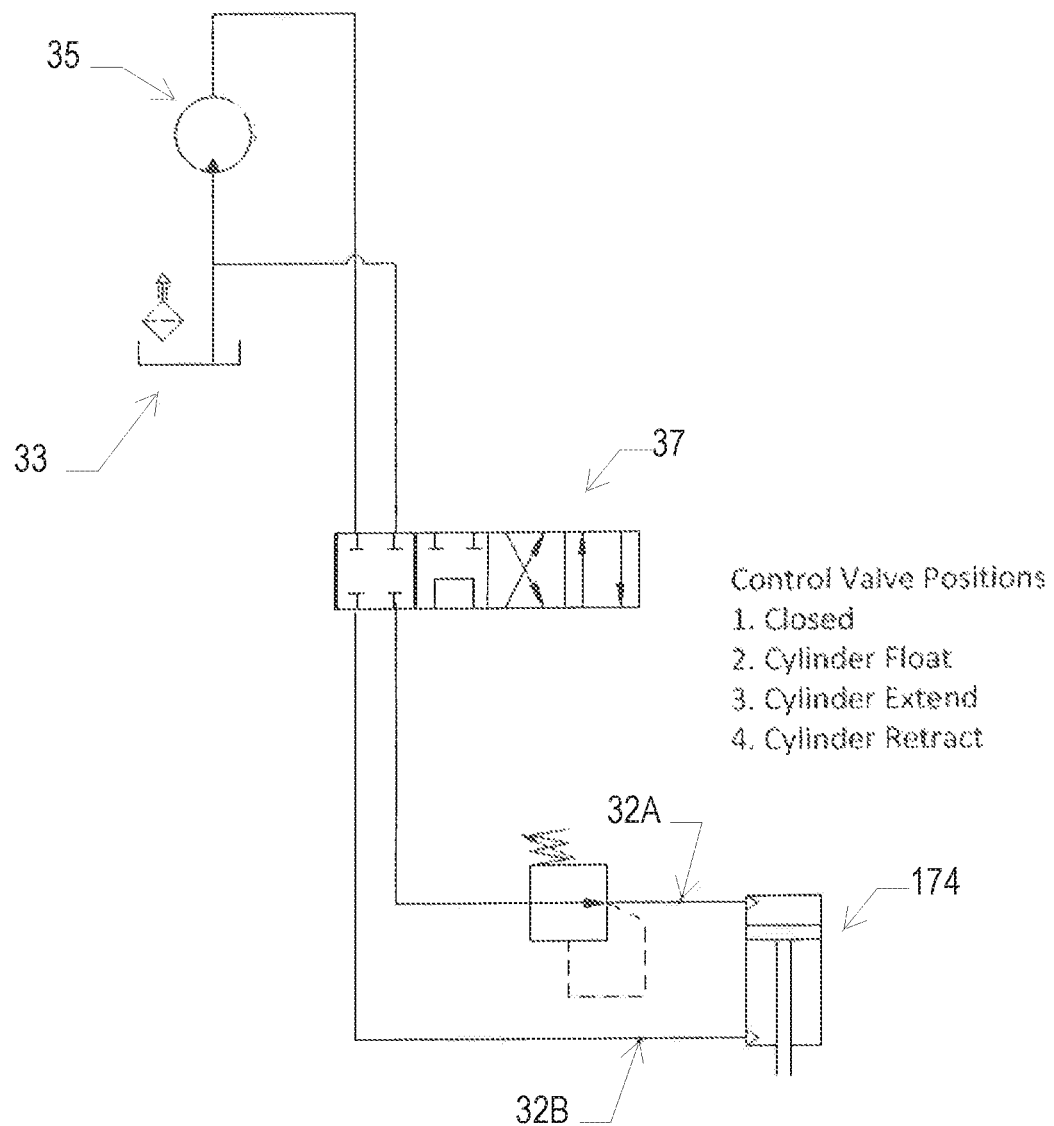
FIG. 4 is a schematic view of an exemplary control circuit for a row unit downforce actuator.

FIG. 4 illustrates an exemplary control circuit for the downforce adjustment mechanism 174, which includes a hydraulic actuator (e.g., double-acting cylinder) as shown. Two control lines 32A, 32B from the actuator are in selective communication with a fluid reservoir 33 and an outlet of a pump 35 through a multi-position control valve 37. The reservoir 33 holds a quantity of fluid at a relatively low pressure (e.g., ambient), or so-called "tank" pressure, while the pump outlet provides a relatively higher fluid pressure source such (e.g., supplied from the reservoir 33) that can be applied to one of the control lines 32A, 32B for applying force to a particular side of the hydraulic actuator of the downforce adjustment mechanism 174. A pressure control valve 39 is positioned along the first control line 32A between the control valve 37 and the hydraulic actuator. The control valve 37 can be a spool valve having a plurality of ports on each side, connectable through various connection passages in accordance with a position of the control valve 37. In the illustrated construction, the control valve 37 has four positions, which are labeled in the legend according to a left-to-right convention of the drawing. In the first position, the control valve 37 is closed and there are no fluid connections of the components on the respective sides of the control valve 37. In the second position, the two control lines 32A, 32B are coupled to each other to define a "float" position of the downforce adjustment mechanism 174, as neither end of the hydraulic actuator of the downforce adjustment mechanism 174 is supplied with pressurized fluid from the pump 35 or connected for draining to tank pressure at the reservoir 33. The third position of the control valve 37 is an extend position, whereby the first control line 32A is coupled to the outlet of the pump 35 and the second control line 32B is coupled to the reservoir 33. In the third position of the control valve 37, the downforce adjustment mechanism 174 can increase downforce. The fourth position of the control valve 37 is a retract position, whereby the second control line 32B is coupled to the outlet of the pump 35 and the first control line 32A is coupled to the reservoir 33. In the fourth position of the control valve 37, the downforce adjustment mechanism 174 can decrease downforce.

In addition to the downforce adjustment mechanism 174, which acts as a main downforce actuator on the entire sub-frame 130 and all ground-engaging implements depending therefrom, the row unit 118 can further include one or more separate downforce adjustment mechanisms 175, 177. For example, a first additional downforce adjustment mechanism 175 can be operably coupled to the row cleaner 23. Alternatively or additionally, an additional downforce adjustment mechanism 177 can be operably coupled to the furrow closer 140. Each of the downforce adjustment mechanisms 175, 177 includes springs, pneumatics, hydraulics, linkages, and/or other structures forming an actuator such that when the downforce adjustment mechanism is activated, it pushes downward to press the implement (i.e., the row cleaner 23 or the furrow closer 140) against the soil 20 with increased force. In some constructions, the downforce adjustment mechanisms 175, 177 change the effective height of the respective implement with respect to the sub-frame 130 and/or with respect to the gauge wheels 132. Either or both of the downforce adjustment mechanisms 175, 177 can be provided as part of a system or control circuit similar to that of FIG. 4, having operational control provided by a control valve like the control valve 37 described above, among others.

With continued reference to FIG. 2, the gauge wheel(s) 132 are coupled to the sub-frame 130 with respective arms 166 and respective pivots 170. Stops 186 are also provided for each gauge wheel arm 166 to limit the upward rotation of each gauge wheel arm 166. The stops 186 are adjustable to a desired position to set the depth 154 of the furrow 136. The position of the stops 186 may be manually adjusted, or a remote adjustment assembly may be included such as shown in U.S. Pat. No. 4,413,685, the entire contents of which are incorporated herein by reference.

The row unit 118 also includes at least one acceleration sensor 148 operable to sense accelerations of the row unit 118, (e.g., from external ground forces on the row unit 118). The illustrated acceleration sensor 148 is supported directly or indirectly by the sub-frame 130. Two different locations for the acceleration sensor 148 are shown in FIG. 2, but they are examples only. In one example, the acceleration sensor 148 is disposed on the sub-frame 130, while in another example it can be disposed on the gauge wheel arm 166 or on one or more of the gauge wheels 132 themselves. In some constructions, more than one row-based acceleration sensor 148 is provided on the row unit 118. These are examples only.

The acceleration sensor 148 can take a wide variety of different forms. For instance, it can be an accelerometer that directly generates a signal indicative of acceleration. The acceleration sensor 148 can also be a pressure sensor disposed to sense the pressure changes in the downforce adjustment mechanism 174 (e.g., within a hydraulic actuator and/or hydraulic circuit coupled to the hydraulic actuator, or within a pneumatic actuator and/or pneumatic circuit coupled to the pneumatic actuator). As accelerations are imparted to the row unit 118, they can be reflected in pressure changes in the downforce adjustment mechanism 174. The acceleration sensor 148 can also be a location sensor that generates a signal indicative of its geographic location or position. As that position changes over time, the acceleration can be derived from the position signal and from a signal indicative of a time or rate of change in that position. Thus, if the acceleration sensor 148 is a position sensor located on the gauge wheel 132, the rate of change in position over time, per unit of time, yields an indication of acceleration of the gauge wheel 132. The acceleration sensor 148 can be another type of sensor as well.

As illustrated in FIG. 2, in some constructions signals from at least one acceleration sensor 148 are sent to a controller 178, which interprets or calculates an acceleration value. In some constructions a display 182 is also provided (e.g., in the operator cab), which displays (e.g., in real time) the acceleration data or data inherently related thereto. The controller 178 may be positioned at various locations on seeding machine 10. For example, in some constructions the controller 178 is positioned within the operator cab, and signals are sent by wire or wirelessly from the acceleration sensor or sensors 148 to the controller 178. In some constructions the acceleration sensor or sensors 148 themselves includes a controller 178. Other constructions include different locations for the controller 178.

The controller 178 (which may include a memory and a processor for receiving and sending signals and performing calculations) uses the received signals to activate and control movement of the downforce adjustment mechanism 174 and to thus control an overall downforce applied to the row unit 118. In some constructions, the controller 178, with data from the acceleration sensor or sensors 148, increases row unit downforce from the downforce adjustment mechanism 174 as travel speed of the seeding machine 10 increases. This can be done with or without reliance on actual speed data (e.g., from a travel speed sensor 190 of the row unit 118 or the seeding machine at large). For example, actual acceleration measurements give an indication of travel speed, and may even be a more beneficial parameter on which to base row unit downforce adjustment, as the typical result of increased travel speed is increased bounce or harshness of the row unit 118 with respect to the ground. A contributor to this phenomenon is that hydraulics in the downforce adjustment mechanism 174 present enhanced rigidity and a general inability to absorb impacts (e.g., rock strikes, etc.) to the row unit 118. Although there are benefits to simply increasing downforce in response to higher seeding machine travel speed (and this may be a function of the control method carried out by the controller 178) the acceleration sensor or sensors 148 allow more advanced control of the downforce adjustment mechanism 174 during operation of the seeding machine 10. For example, the signals from the acceleration sensor or sensors 148 can be used to identify the onset of an impact event to the row unit 118, whereby the controller 178 responds to quickly relieve downforce in the downforce adjustment mechanism 174.

Figure 3:
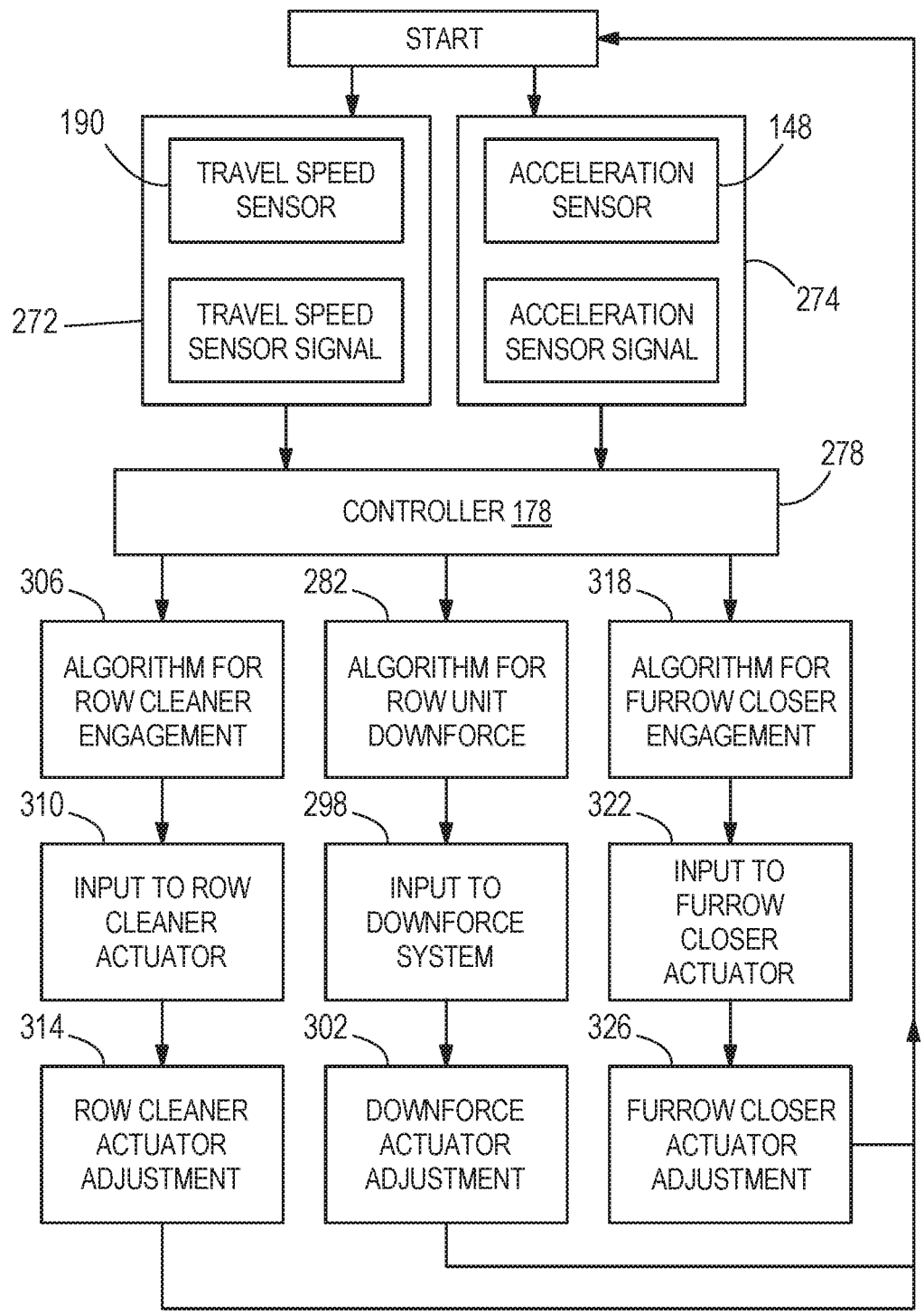
FIG. 3 is a side view of the row unit including an acceleration sensor according to a first embodiment.

With reference to FIG. 3, from the start of operation of the seed machine 10, the travel speed sensor 190 measures travel speed of the seed machine 10 and reports the travel speed signal to the controller 178. Meanwhile, for example (and simultaneously with step 272), the acceleration sensor or sensors 148 generates signals (e.g., based on measured acceleration) at step 274, and corresponding acceleration signals are sent to the controller 178, which at step 278 receives the signals. With reference to the center column of FIG. 3, the method continues with step 282 in which an algorithm of the controller 178 is used for determining row unit downforce (e.g., a target downforce value). The target downforce value can be calculated by the controller 178 based on one or both of the signals from steps 272 and 274. From the algorithm, the controller 178 generates an input for the downforce system having the adjustment mechanism 174 at step 298, and this effects a downforce adjustment at step 302. This downforce control algorithm can be programmed to calculate the appropriate target downforce value (e.g., based on various soil conditions, travel speed, etc.), but may also be manually overridden with a specific command from an operator. The algorithm can be programmed to measure resultant downforce, for example at the downforce adjustment mechanism 174 or elsewhere on the row unit 118, and to continuously make adjustments to the downforce as needed (e.g., creating a closed loop). It should also be appreciated that the target downforce value can be a range of values defining a control band in which downforce is to be maintained. The input of step 298 can be an input to the control valve 37 of FIG. 4, which in turn effects the downforce actuator adjustment of step 302. The controller 178 may also provide an input to the pump 35, controlling an operation and/or output thereof.

As discussed above, the downforce control algorithm may further be programmed with a feature to abandon the target downforce value and relieve the actuator provided by the downforce adjustment mechanism 174 in response to a signal from the acceleration sensor or sensors 148 indicative of acceleration of the row unit 118 in excess of a predetermined threshold. For example, the controller 178 can be programmed to momentarily pause the normal downforce control algorithm (e.g., for a predetermined amount of time, or for an indeterminate amount of time that is dependent upon the acceleration observed—the value and/or duration thereof) before automatically resuming. Abandoning the target downforce value effectively transitions the downforce adjustment mechanism 174 and the row unit as a whole from a rigid active-downforce state into a deactivated or semi-deactivated impact-absorbing mode or "float" mode in which the downforce is allowed to drop below the target downforce value. This allows the row unit 118 to absorb the impact and float over a ground obstruction rather that receiving the impact directly and suffering the potential consequences, such as erratic bounce and/or structural damage. The float mode can include a partial or full relief of pressure in the downforce adjustment mechanism 174 timed to coincide with the engagement with the obstruction as identified by the acceleration sensor or sensors 148. The transition to the float mode can be accomplished in some constructions by putting the control valve 37 into the second position so that the actuator of the downforce adjustment mechanism 174 is positively in the float setting in which its two sides (i.e., extension and retraction sides) are coupled to each other. In other constructions, float mode can include a programmed execution of a downforce reduction strategy that drops downforce below the target downforce value. Such a downforce reduction strategy can reduce downforce by a predetermined amount of force, or by a predetermined ratio or percentage of the target downforce value. However, the downforce reduction strategy should not be confused with setting a new target downforce value, since it is not based on planting performance metrics, but rather the occurrence of the of the row unit acceleration in excess of the threshold. The method of downforce control is not exclusive and may incorporate one or more additional features or functions, such as monitoring furrow depth, controlling forward travel speed of the seeding machine 10, and evaluating soil moisture content to determine downforce and/or depth targets, among others.

As noted in FIG. 3, there are additional aspects of the row unit 118 and operating methods thereof, each of which can be carried out alone or in combination with other aspect(s) disclosed herein in a particular row unit construction. For example, along the left side of FIG. 3 an active row cleaner engagement routine is disclosed, and along the right side of FIG. 3 an active furrow closer engagement routine is disclosed, and these are described below in respective order. Beginning at step 306, an algorithm programmed to the controller 178 operates to determine desired soil engagement of the row cleaner 23. This, like the algorithm for row unit downforce, can be carried out on the basis of information from one or both of the steps 272, 274 in which travel speed and/or acceleration are reported to the controller 178. That is to say the algorithm may determine an engagement setting for the row cleaner 23 (in terms of downforce or relative height) that is based on travel speed, based on acceleration, or based on a combination of travel speed and acceleration. From the algorithm, the controller 178 generates an input for the row cleaner downforce adjustment mechanism 175 at step 310, and this effects an adjustment at step 314. Like the primary downforce control algorithm, the setting for the row cleaner 23 may also be able to be manually overridden with a specific command from an operator. The algorithm can be programmed to measure resultant downforce at the row cleaner, for example at the row cleaner downforce adjustment mechanism 175 or elsewhere on the row cleaner 23, and to continuously make adjustments to the row cleaner downforce as needed (e.g., creating a closed loop). The active row cleaner engagement control, however, can also be operated as an open loop control. The row cleaner engagement control can specifically be programmed to reduce the soil engagement setting in response to an increase in travel speed (and likewise increase the soil engagement setting in response to a decrease in travel speed), as the row cleaner 23 may gain effectiveness with increased speed. This is one example of a relationship between speed and adjustment of row cleaner engagement setting, which may apply for many soil conditions. However, alternate soil conditions may dictate that the controller 178 be programmed to increase the soil engagement setting for the row cleaner 23 in response to increased travel speed to maintain the desired efficacy of the row cleaner 23. The row cleaner engagement control provides an implement-specific downforce control method, which is still subject to the overall row unit downforce control method. In other words, the active control of the row cleaner downforce adjustment mechanism 175 can operate to vary the proportion of total row unit downforce borne by the row cleaner 23 during operation in order to maintain a value at a desired amount or within a desired range.

The same can be said for the active furrow closer engagement routine, which at step 318 operates an algorithm programmed to the controller 178 to determine desired soil engagement of the furrow closer 140 (in terms of downforce or relative height). This can be carried out on the basis of travel speed and/or acceleration information from one or both of the steps 272, 274. From the algorithm, the controller 178 generates an input for the furrow closer downforce adjustment mechanism 177 at step 322, and this effects an adjustment at step 326. Like the primary downforce control algorithm, the setting for the furrow closer 140 may also be manually overridden with a specific command from an operator, and the control may be open loop or closed loop (e.g., with feedback from a furrow closer downforce sensor). The furrow closer engagement control can specifically be programmed to increase the closing force in response to an increase in travel speed (and vice versa), as additional closing force may be needed to maintain effectiveness with increased speed, which may cause increased bounce of the furrow closer 140 over the soil 20.

Following are several clauses describing various embodiments and concepts disclosed herein:

Clause 1. A row unit for a seeding machine operable to plant seeds into soil, the row unit comprising: a frame supporting a furrow opener for opening a furrow in the soil, a gauge wheel for rolling atop the soil, a seed dispenser for dispensing seeds into the furrow, and a furrow closer for closing the furrow; a row unit downforce actuator operable to push the row unit frame toward the soil to adjustably control soil engagement forces for the furrow opener, the gauge wheel, and the furrow closer; an acceleration sensor configured to detect accelerations of the row unit; and a controller in communication with the acceleration sensor and the row unit downforce actuator, the controller programmed with an algorithm to maintain a target downforce value during operation of the row unit, wherein the controller is further programmed to abandon the target downforce value and relieve the row unit downforce actuator in response to a signal from the acceleration sensor indicative of acceleration of the row unit in excess of a predetermined threshold.

Clause 2. The row unit of clause 1, wherein the controller is programmed to control the row unit downforce actuator to maintain the target downforce value within a control band, and wherein relieving the row unit downforce actuator includes reducing the downforce produced by the row unit downforce actuator to a value outside the control band.

Clause 3. The row unit of clause 1, wherein the row unit downforce actuator is a hydraulic actuator in communication with a hydraulic circuit having a control valve, and wherein the control valve is operable by the controller to put the hydraulic actuator into a float setting whereby two opposite ends of the hydraulic actuator are connected to each other in response to the signal from the acceleration sensor indicative of acceleration of the row unit in excess of a predetermined threshold.

Clause 4. The row unit of clause 1, wherein the controller transitions the row unit from a rigid active-downforce state to a floating state that enables the row unit to float over soil obstructions when the row unit downforce actuator is relieved.

Clause 5. The row unit of clause 4, wherein the controller is programmed to return the row unit to a rigid active-downforce state upon the expiration of a predetermined time period.

Clause 6. The row unit of clause 4, wherein the controller is programmed to return the row unit to a rigid active-downforce state upon the absence of the signal from the acceleration sensor indicative of acceleration of the row unit in excess of the predetermined threshold.

Clause 7. The row unit of clause 1, wherein the controller algorithm is programmed to increase the target downforce value with increasing travel speed of the row unit relative to the ground.

Clause 8. A row unit for a seeding machine operable to plant seeds into soil, the row unit comprising: a frame supporting a furrow opener for opening a furrow in the soil, a gauge wheel for rolling atop the soil, a seed dispenser for dispensing seeds into the furrow, and a furrow closer for closing the furrow; a furrow closer downforce actuator operable between the row unit frame and the furrow closer to exert an adjustable force that pushes the furrow closer downward on the soil; a controller programmed to increase downforce in response to a detected increase in travel speed of the row unit.

Clause 9. The control system of clause 8, further comprising a row unit downforce actuator controlled by the controller separately from the furrow closer, wherein the controller is programmed to increase a target downforce value for the row unit as a whole in response to the detected increase in travel speed.

Clause 10. The control system of clause 8, further comprising a speed sensor operable to measure the travel speed of the row unit and input a signal representative of the travel speed to the controller.

Clause 11. The control system of clause 8, further comprising an acceleration sensor operable to detect accelerations of the row unit and provide acceleration signals representative thereof to the controller, wherein the controller is programmed to derive the travel speed of the row unit from the acceleration signals.

Clause 12. The control system of clause 8, wherein the controller is programmed to detect the increase in travel speed of the row unit by detection of an operator travel speed input from an operator.

Clause 13. A row unit for a seeding machine operable to plant seeds into soil, the row unit comprising: a frame supporting a furrow opener for opening a furrow in the soil, a gauge wheel for rolling atop the soil, a seed dispenser for dispensing seeds into the furrow, and a furrow closer for closing the furrow; a row cleaner positioned and operable to engage the soil and clear residue from the path forward of the furrow opener, the row cleaner supported by the frame to be adjustable through a range of soil engagement settings; and a controller programmed to adjust a row cleaner engagement setting in response to a detected travel speed of the row unit.

Clause 14. The row unit of clause 13, further comprising a row unit downforce actuator controlled by the controller, wherein the controller is programmed to adjust a target downforce value for the row unit as a whole in response to the detected travel speed.

Clause 15. The row unit of clause 13, wherein the row cleaner is a force-adjustable row cleaner adjustably supported by a variable force actuator, and the controller is programmed to adjust a force from the variable force actuator in response to the detected travel speed, the adjusted force providing an adjusted soil engagement setting within the range of soil engagement settings.

Clause 16. The row unit of clause 13, wherein the row cleaner is height-adjustable with respect to the frame, and the range of soil engagement settings corresponds to a range of height settings such that the controller is programmed to adjust a height of the row cleaner from the soil to provide an adjusted soil engagement setting within the range of soil engagement settings.

Clause 17. The row unit of clause 13, further comprising a speed sensor operable to measure the travel speed of the row unit and input a signal representative of the travel speed to the controller.

Clause 18. The row unit of clause 13, further comprising an acceleration sensor operable to detect accelerations of the row unit and provide acceleration signals representative thereof to the controller, wherein the controller is programmed to derive the travel speed of the row unit from the acceleration signals.

Clause 19. The row unit of clause 13, wherein the controller is programmed to detect the travel speed of the row unit by detection of an operator travel speed input from an operator.

Clause 20. The row unit of clause 13, wherein the controller is programmed to reduce the row cleaner engagement setting in response to a detected increase in travel speed of the row unit.

Any of the above referenced aspects of the disclosure can be combined with any one or more of the above referenced aspects of the disclosure.

Various features and advantages of the disclosure are set forth in the following claims.

What is claimed is:

1. A row unit for a seeding machine operable to plant seeds into soil, the row unit comprising:
    a frame supporting a furrow opener for opening a furrow in the soil, a gauge wheel for rolling atop the soil, a seed dispenser for dispensing seeds into the furrow, and a furrow closer for closing the furrow;
    a row unit downforce actuator operable to push the row unit frame toward the soil to adjustably control soil engagement forces for the furrow opener, the gauge wheel, and the furrow closer;
    an acceleration sensor configured to detect accelerations of the row unit; and
    a controller in communication with the acceleration sensor and the row unit downforce actuator, the controller programmed with an algorithm to maintain a target downforce value during operation of the row unit,
    wherein the controller is further programmed to abandon the target downforce value and relieve the row unit downforce actuator in response to a signal from the acceleration sensor indicative of acceleration of the row unit in excess of a predetermined threshold.

2. The row unit of claim 1, wherein the controller is programmed to control the row unit downforce actuator to maintain the target downforce value within a control band, and wherein relieving the row unit downforce actuator includes reducing the downforce produced by the row unit downforce actuator to a value outside the control band.

3. The row unit of claim 1, wherein the row unit downforce actuator is a hydraulic actuator in communication with a hydraulic circuit having a control valve, and wherein the control valve is operable by the controller to put the hydraulic actuator into a float setting whereby two opposite ends of the hydraulic actuator are connected to each other in response to the signal from the acceleration sensor indicative of acceleration of the row unit in excess of a predetermined threshold.

4. The row unit of claim 1, wherein the controller transitions the row unit from a rigid active-downforce state to a floating state that enables the row unit to float over soil obstructions when the row unit downforce actuator is relieved.

5. The row unit of claim 4, wherein the controller is programmed to return the row unit to a rigid active-downforce state upon the expiration of a predetermined time period.

6. The row unit of claim 4, wherein the controller is programmed to return the row unit to a rigid active-downforce state upon the absence of the signal from the acceleration sensor indicative of acceleration of the row unit in excess of the predetermined threshold.

7. The row unit of claim 1, wherein the controller algorithm is programmed to increase the target downforce value with increasing travel speed of the row unit relative to the ground.

8. A row unit for a seeding machine operable to plant seeds into soil, the row unit comprising:
  a frame supporting a furrow opener for opening a furrow in the soil, a gauge wheel for rolling atop the soil, a seed dispenser for dispensing seeds into the furrow, and a furrow closer for closing the furrow;
  a furrow closer downforce actuator operable between the row unit frame and the furrow closer to exert an adjustable force that pushes the furrow closer downward on the soil; and a controller programmed to increase downforce in response to a detected increase in travel speed of the row unit.

9. The row unit of claim 8, further comprising a row unit downforce actuator controlled by the controller separately from the furrow closer, wherein the controller is programmed to increase a target downforce value for the row unit as a whole in response to the detected increase in travel speed.

10. The row unit of claim 8, further comprising a speed sensor operable to measure the travel speed of the row unit and input a signal representative of the travel speed to the controller.

11. The row unit of claim 8, further comprising an acceleration sensor operable to detect accelerations of the row unit and provide acceleration signals representative thereof to the controller, wherein the controller is programmed to derive the travel speed of the row unit from the acceleration signals.

12. The row unit of claim 8, wherein the controller is programmed to detect the increase in travel speed of the row unit by detection of an operator travel speed input from an operator.

13. A row unit for a seeding machine operable to plant seeds into soil, the row unit comprising:
  a frame supporting a furrow opener for opening a furrow in the soil, a gauge wheel for rolling atop the soil, a seed dispenser for dispensing seeds into the furrow, and a furrow closer for closing the furrow;
  a row cleaner positioned and operable to engage the soil and clear residue from the path forward of the furrow opener, the row cleaner supported by the frame to be adjustable through a range of soil engagement settings; and
  a controller programmed to adjust a row cleaner engagement setting in response to a detected travel speed of the row unit.

14. The row unit of claim 13, further comprising a row unit downforce actuator controlled by the controller, wherein the controller is programmed to adjust a target downforce value for the row unit as a whole in response to the detected travel speed.

15. The row unit of claim 13, wherein the row cleaner is a force-adjustable row cleaner adjustably supported by a variable force actuator, and the controller is programmed to adjust a force from the variable force actuator in response to the detected travel speed, the adjusted force providing an adjusted soil engagement setting within the range of soil engagement settings.

16. The row unit of claim 13, wherein the row cleaner is height-adjustable with respect to the frame, and the range of soil engagement settings corresponds to a range of height settings such that the controller is programmed to adjust a height of the row cleaner from the soil to provide an adjusted soil engagement setting within the range of soil engagement settings.

17. The row unit of claim 13, further comprising a speed sensor operable to measure the travel speed of the row unit and input a signal representative of the travel speed to the controller.

18. The row unit of claim 13, further comprising an acceleration sensor operable to detect accelerations of the row unit and provide acceleration signals representative thereof to the controller, wherein the controller is programmed to derive the travel speed of the row unit from the acceleration signals.

19. The row unit of claim 13, wherein the controller is programmed to detect the travel speed of the row unit by detection of an operator travel speed input from an operator.

20. The row unit of claim 13, wherein the controller is programmed to reduce the row cleaner engagement setting in response to a detected increase in travel speed of the row unit.

* * * * *